(12) United States Patent
Gehl et al.

(10) Patent No.: US 10,680,926 B2
(45) Date of Patent: Jun. 9, 2020

(54) DISPLAYING ADAPTIVE CONTENT IN HETEROGENEOUS PERFORMANCE MONITORING AND TROUBLESHOOTING ENVIRONMENTS

(71) Applicant: Riverbed Technology, Inc., San Francisco, CA (US)

(72) Inventors: Ryan Gehl, Chevy Chase, MD (US); Russell Elsner, Germantown, MD (US); Eric Rogner, Kensington, MD (US); David Berman, Rockville, MD (US); Laura Harrison, Westford, MA (US)

(73) Assignee: Riverbed Technology, Inc., San Francisco, CA (US)

( * ) Notice: Subject to any disclaimer, the term of this patent is extended or adjusted under 35 U.S.C. 154(b) by 84 days.

(21) Appl. No.: 15/093,060

(22) Filed: Apr. 7, 2016

(65) Prior Publication Data

US 2016/0301584 A1  Oct. 13, 2016

Related U.S. Application Data

(60) Provisional application No. 62/145,280, filed on Apr. 9, 2015.

(51) Int. Cl.
*H04L 12/26* (2006.01)
*H04L 12/24* (2006.01)

(52) U.S. Cl.
CPC ...... *H04L 43/0876* (2013.01); *H04L 43/0817* (2013.01); *H04L 43/0888* (2013.01); *H04L 41/145* (2013.01)

(58) Field of Classification Search
None
See application file for complete search history.

(56) References Cited

U.S. PATENT DOCUMENTS

| | | | |
|---|---|---|---|
| 2002/0177907 A1* | 11/2002 | Hand | G06F 11/323 700/1 |
| 2003/0065816 A1* | 4/2003 | Dharmadhikari | H04L 45/02 709/240 |
| 2009/0113303 A1* | 4/2009 | Goossen | A63F 13/10 715/719 |

(Continued)

*Primary Examiner* — Younes Naji
(74) *Attorney, Agent, or Firm* — Park, Vaughan, Fleming & Dowler LLP; Laxman Sahasrabuddhe

(57) ABSTRACT

Systems, methods, and computer program embodiments are disclosed for adaptively displaying application performance data. In an embodiment, a plurality of performance monitoring data sources may be identified based on an application model that defines the topological structure of a software application. A request may be received for performance data associated with the application. One or more content options may then be determined based on the received request, and each content option may include one or more target performance metrics. Each content option may also be associated with one or more data sources. For each content option, the associated data sources may be queried to identify available data sources containing relevant performance data. A content option may be selected from the determined content options based on a priority associated with the content option. The performance data corresponding to the selected content option may subsequently be retrieved and presented for display.

15 Claims, 10 Drawing Sheets

(56) References Cited

U.S. PATENT DOCUMENTS

| | | | |
|---|---|---|---|
| 2009/0199054 A1* | 8/2009 | Embree | H04L 41/0686 714/57 |
| 2010/0023501 A1* | 1/2010 | Baris | G06F 17/30545 707/E17.014 |
| 2010/0023504 A1* | 1/2010 | Baris | G06F 16/2471 707/E17.014 |
| 2010/0131960 A1* | 5/2010 | Suganthi | H04L 63/0272 718/105 |
| 2010/0293039 A1* | 11/2010 | Whitsitt | G06Q 10/06 705/7.42 |
| 2010/0318931 A1* | 12/2010 | Boykin | G06F 3/0482 715/771 |
| 2012/0047512 A1* | 2/2012 | Morris | G06F 9/5027 718/104 |
| 2012/0233316 A1* | 9/2012 | Nakajima | G06F 11/3034 709/224 |
| 2012/0259793 A1* | 10/2012 | Umansky | G06Q 10/06 705/348 |
| 2014/0067407 A1* | 3/2014 | Sathe | G06Q 50/22 705/2 |
| 2014/0359241 A1* | 12/2014 | Dell | G06F 12/02 711/165 |
| 2015/0222715 A1* | 8/2015 | Rahman | H04L 43/08 709/224 |
| 2016/0093226 A1* | 3/2016 | Machluf | G06Q 10/10 434/236 |
| 2016/0188693 A1* | 6/2016 | Peters | G06F 16/337 707/737 |

\* cited by examiner

DISPLAYING ADAPTIVE CONTENT IN HETEROGENEOUS PERFORMANCE MONITORING AND TROUBLESHOOTING ENVIRONMENTS

CROSS REFERENCE TO RELATED APPLICATIONS

This application claims the benefit of U.S. Provisional Patent Application No. 62/145,280, filed Apr. 9, 2015, titled "SYSTEM AND METHOD FOR DISPLAYING ADAPTIVE CONTENT IN HETEROGENEOUS PERFORMANCE MONITORING AND TROUBLESHOOTING ENVIRONMENTS," which is hereby incorporated herein by reference in its entirety.

BACKGROUND

Field

This disclosure generally relates to software application performance management.

Background

Developers and application providers need to ensure that applications consistently deliver a high level of service to customers. Application performance monitoring devices are often used to help diagnose and detect application performance issues in order to ensure an expected level of service is maintained. These performance monitoring devices may gather data for relevant performance metrics using a variety of techniques including, for example, web page tagging, packet capture and analysis, NetFlow collection and analysis, synthetic transactions, remote data collection, and deep dive component monitoring of internal code elements.

These techniques may provide valuable information about application performance, but each measurement technique is typically employed by a distinct point product and targeted at a particular set of users. Collaboration between multiple users having different roles is often necessary to identify relevant performance data from each performance monitoring device and to gain an understanding of performance issues across all components of an application. Hence, a solution is needed that enables a single user to view relevant performance data from multiple performance monitoring devices coupled to an application without requiring an intimate knowledge and understanding of the application architecture.

SUMMARY

Systems, methods, and computer program embodiments are disclosed for adaptively displaying application performance data. In an embodiment, a plurality of performance monitoring data sources may be identified based on an application model that defines the topological structure of a software application. A request may be received for performance data associated with the application. One or more content options may then be determined based on the received request, and each content option may include one or more target performance metrics. Each content option may also be associated with one or more of the plurality of performance monitoring data sources. In an embodiment, the plurality of performance monitoring data sources may either be specified in the application model or coupled to the software application. The identified plurality of data sources may additionally be filtered based on a type associated with each target performance metric of the determined content options.

For each content option, the associated performance monitoring data sources may then be queried to identify available data sources that contain performance data corresponding to one or more of the target performance metrics of the content option. A content option may be selected from the one or more determined content options based on a priority associated with each content option and the identified availability of associated data sources for each content option. The performance data corresponding to the target performance metrics of the selected content option may subsequently be retrieved from one or more the identified available data sources of the identified list. Finally, the retrieved performance data may be presented for display to a user.

Further embodiments, features, and advantages of the invention, as well as the structure and operation of the various embodiments, are described in detail below with reference to accompanying drawings.

BRIEF DESCRIPTION OF THE DRAWINGS

The accompanying drawings, which are incorporated herein and form part of the specification, illustrate the present disclosure and, together with the description, further serve to explain the principles of the disclosure and to enable a person skilled in the relevant art to make and use the disclosure.

The drawing in which an element first appears is typically indicated by the leftmost digit or digits in the corresponding reference number. In the drawings, like reference numbers may indicate identical or functionally similar elements.

DETAILED DESCRIPTION

Example Performance Monitoring Configuration

In the detailed description that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1:
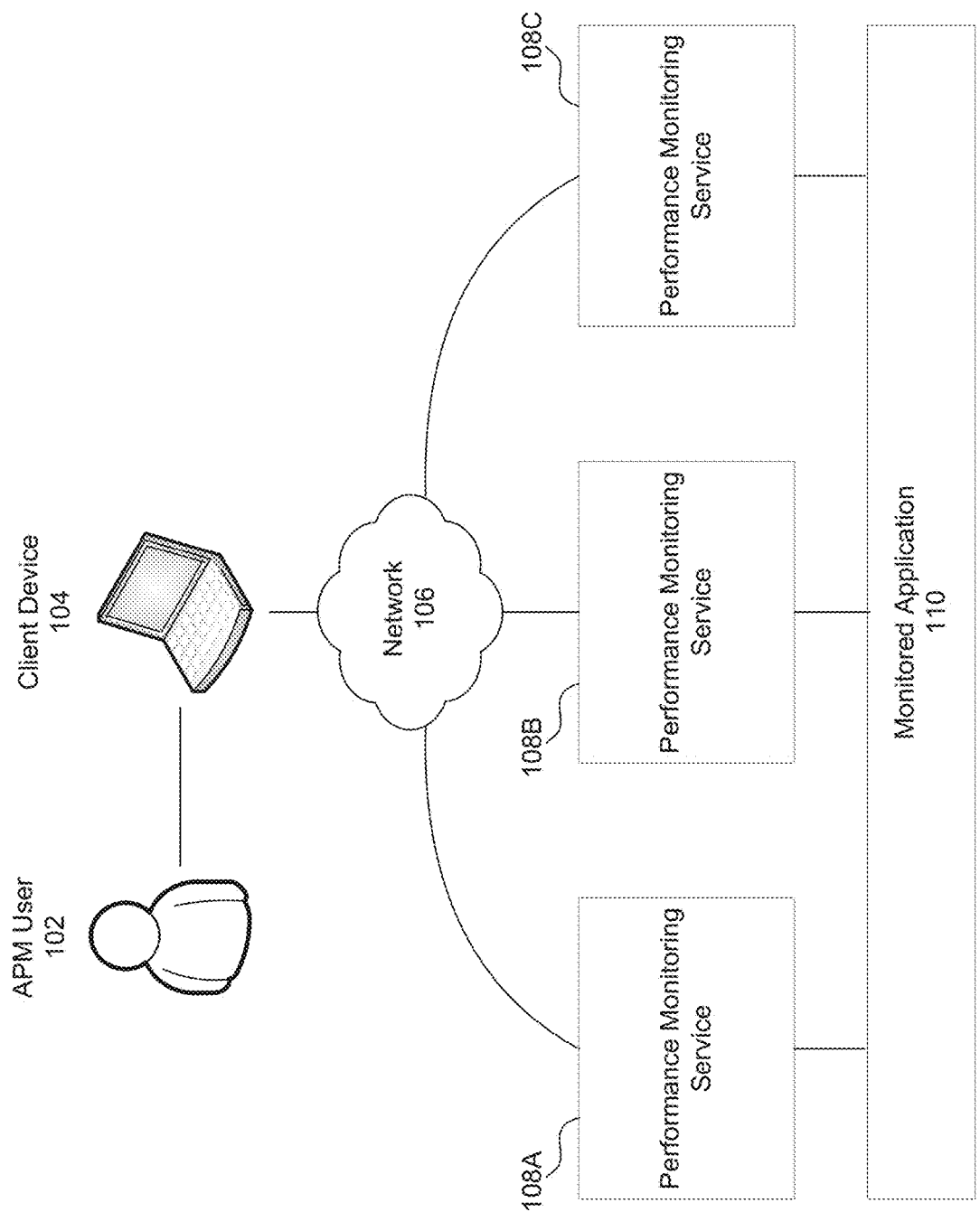
FIG. 1 is a diagram illustrating an example application performance monitoring configuration, according to an embodiment.

FIG. 1 is a diagram illustrating an example application performance monitoring configuration 100, according to an embodiment. Application performance monitoring configuration 100 includes an application performance monitoring (APM) user 102, a client device 104, and a network 106. Client device 104 may be coupled to network 106, and network 106 may be any type of computer network capable of communicating data, such as for example, a wired or wireless local area network or a wide area network (e.g., the Internet), or any combination thereof. Client device 104 may be coupled via network 106 to a plurality of performance monitoring devices or services 108 configured to monitor performance of monitored application 110.

In an embodiment, monitored application 110 may represent any type of software application, for example a hosted web application or mobile application. Performance monitoring services 108A, 108B, and 108C may monitor and collect performance data for monitored application 110. In various embodiments, performance monitoring services 108 may be implemented on servers or specialized appliances coupled to monitored application 110. Performance monitoring services may also be implemented on servers involved in the execution of monitored application 110.

In contrast to an ordinary consumer (e.g., end user) of an application, APM user 102 is concerned with application performance monitoring data collected by performance monitoring services 108. In an embodiment, APM user 102 operates client device 104 to view and interact with collected application performance monitoring data, typically by interacting directly with performance monitoring services 108.

Generally, in the field of Application Performance Management, there are many techniques to monitor the performance of an application. These techniques may include, for example, web page tagging to capture end user experience metrics, such as page response time, page render time, and page download time, packet capture and analysis to observe network packets related to user transactions as they traverse a network, NetFlow collection and analysis to record throughput and utilization metrics by monitoring network traffic entering or exiting interfaces within a network, synthetic transactions to measure availability and response time of application components from distributed test locations, remote data collection to collect performance data from an operating system using standard application programming interfaces (APIs), such as SNMP and WMI, and deep dive component monitoring to provide code instrumentation that can monitor method-level execution, sequence, and timing details, such as for Java and .NET applications. Each of these performance monitoring techniques is commonly implemented as a separate performance monitoring service and/or device.

In an example performance monitoring environment such as that depicted by application performance monitoring configuration 100, an APM user 102 may desire to view collected application performance data from one or more performance monitoring services 108. Performance monitoring services 108 may act as performance monitoring data sources to store performance data and provide that performance data in response to a request. However, for APM user 102 to access performance data from performance monitoring services 108, the user must know which performance monitoring services exist, how to access those performance monitoring data sources, and what performance metrics are most relevant to the desires of the user or the situation at hand.

Further, performance data from each performance monitoring service 108 may be accessible through its own interface, whether a graphical user interface, an application programming interface (API), or other interface supporting data queries. A single user often does not have a complete understanding of the architecture of a modern, multi-tier application, let alone access to or knowledge of each performance monitoring service 108. Each performance monitoring service 108 may provide data about the application from a different perspective, typically requiring an operator to be an expert in each of the individual performance monitoring service employed. Thus, viewing data from multiple performance monitoring data sources and determining which data are most relevant to a particular user or situation may become a cumbersome task, requiring collaboration between multiple users and manual aggregation of data from multiple data sources. Certain embodiments presented herein address these issues by modeling the topological structure of an application and collecting performance data from multiple performance monitoring services for presentation in a single interactive user interface.

Example System

Figure 2:
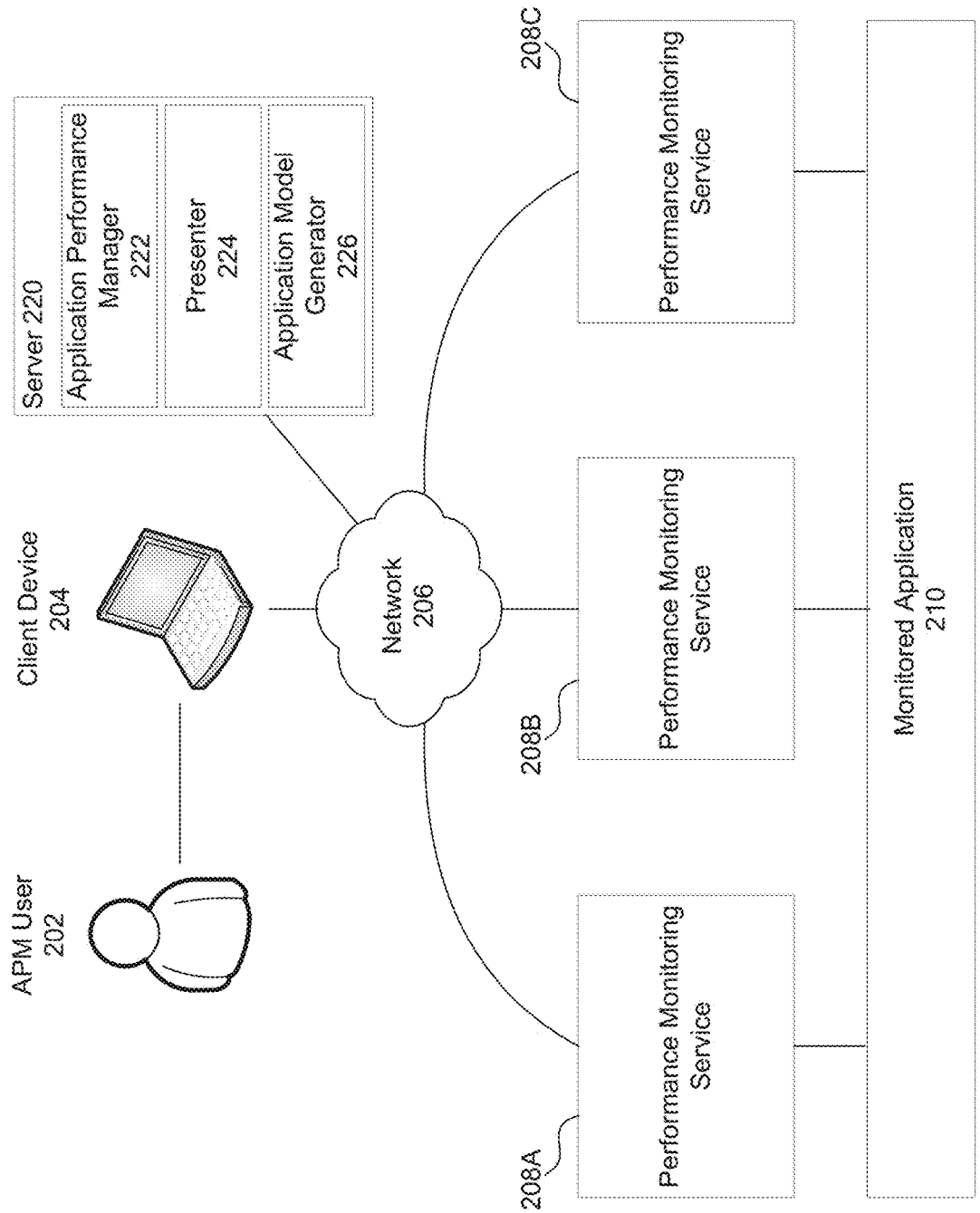
FIG. 2 is a diagram illustrating an example system for monitoring and adaptively displaying application performance data, according to an embodiment.

FIG. 2 is a diagram illustrating an example system 200 for monitoring and adaptively displaying application performance data, according to an embodiment. System 200 includes an application performance monitoring (APM) user 202, a client device 204, and a network 206. Client device 204 may be coupled to network 206, and network 206 may be any type of computer network capable of communicating data, such as for example, a wired or wireless local area network or a wide area network (e.g., the Internet), or any combination thereof. System 200 also includes a server 220 coupled via network 206 to client device 204 and a plurality of performance monitoring devices or services 208 configured to monitor performance of application 210. Network 206, performance monitoring services 208, and application 210 may be similar to network 106, performance monitoring services 108, and monitored application 110, respectively, as described with respect to FIG. 1.

In an embodiment, server 220 includes application performance manager 222, presenter 224, and application model generator 226. In various embodiments, application performance manager 222, presenter 224, and application model generator 226 may be implemented as software executing on the same or different computing devices, and each component may be implemented on a single computing device or distributed among a plurality of physical and/or virtual servers. Application performance manager 222 and presenter 224 may communicate with performance monitoring services 208 and client 204 to retrieve performance data related to application 210 and intelligently and intuitively present the data in an interactive, graphical user interface. In this manner, application performance manager 222 and presenter 224 may reduce the burden on and knowledge required of APM user 202 to retrieve and view relevant application performance data.

In an embodiment, application performance manager 222 may receive requests for performance data associated with application 210 from client device 204. Application performance manager 222 may then determine one or more content options based on the received request, each request including one or more target performance metrics. For example, a request to view performance data associated with a particular host server may correspond to one or more host detail content options that include appropriate target performance metrics related to performance of the host server. In another example, a request may correspond to content options tailored toward the requesting user. For instance, if the role of APM user 202 is an application developer, application performance manager 222 may determine content options that include target performance metrics related to application instrumentation and code-level execution statistics. Here, the content options may also include additional target performance metrics that are part of larger logical groupings of performance metrics.

Further examples of target performance metrics may include, but are not limited to, end user response times, internal code- or method-level response times, database load, and CPU usage. Target performance metrics may be directed at some or all application components of application 210, or at individual application components, such as individual servers, networking elements, application code modules, end users, or any combination thereof.

In an embodiment, APM user 202 may initiate a request by selecting a dashboard to view. A dashboard may be associated with one or more content options, which may be predefined (e.g., stored as lists of content options) or determined dynamically based on the received request. For example, content options associated with the dashboard may be determined dynamically from existing content options based on relevance to the received request, characteristics of the requesting user (e.g., user roles and user preferences), and/or additional filtering parameters. In an embodiment, when a request to view a dashboard is received, application performance manager 222 may choose a content option for display from a collection of content options associated with the dashboard based on priorities defined within the collection of content options, as will be explained further below. For example, the dashboard may correspond to a configuration file containing a prioritized list of content options for display.

Application performance manager may also identify a plurality of performance monitoring services 208 configured to monitor application 210 based on an application model. In an embodiment, the application model describes the topological structure of application 210, including servers involved in the execution of application 210 and relationships that indicate data flowing between the servers. The application model may further describe connections and relationships between the servers in the application model and end users of the application. In addition to the topological structure of the application, the application model may store information about performance monitoring devices and services, such as performance monitoring services 208A, 208B, and 208C, that are configured to monitor the plurality of servers and data flowing within the application. These performance monitoring services may act as data sources that store and provide performance data related to one or more performance metrics. The application model may be defined via application model generator 226 with the assistance of a user, such as an administrator of the application. Additional details with regard to defining the application model are described below with respect to FIG. 3.

In an embodiment, each target performance metric may be associated with a performance data type. A performance data type may describe any logical classification of performance data, for example, end-user experience, application performance, or network performance. In an embodiment, each performance monitoring data source may store performance data related to one or more performance data types. In a further embodiment, a target performance metric may be classified as more than one type. Application performance manager 222 may use the types of a target performance metrics included in the received request to filter the plurality of performance monitoring data sources relevant to the request. That is, data sources that do not contain performance data corresponding to the performance data types of the target performance metrics may be filtered for purposes of fulfilling the received request.

In an embodiment, each content option may be associated with one or more of the identified performance monitoring data sources. For each content option determined based on the received request, application performance manager 222 may query each associated data source containing performance data corresponding to one or more of the target performance metrics of the content option to identify whether the data source is available (e.g., connected). In an embodiment, application performance manager 222 may construct individual queries for each of the plurality of performance monitoring data sources based on information derived from the application model. For example, a particular data source may publish a query API, accept direct database queries, or only accept protocol-specific messages. Queries may be constructed accordingly to identify performance data available from each data source that correspond to the target performance metrics. In this manner, APM user 202 does not need to understand how to directly query each performance monitoring data source to determine whether relevant performance data exists.

In an embodiment, application performance manager 222 may select a content option from the one or more determined content options based on priorities associated with each content option and the availability of associated data sources for each content option. In an embodiment, priorities of content options may be assigned, for example, based on data quality, user roles, or user preferences, and are intended to denote content options with the most relevant data to the received user request. In this manner, application performance monitor 222 may select the content option with the highest priority that includes relevant performance data from available data sources.

In an embodiment, each performance monitoring data source may also be assigned a relative priority used in determining when to display performance data from the data source. This priority may be assigned at a global level such that performance data from a higher priority data source generally may be preferred over a lower priority data source. In an embodiment, multiple priorities may be hierarchically assigned to each data source, for example a global priority and a priority for a particular content option. Different priorities may also be assigned for individual users or groups of users. In an embodiment, priorities may be determined automatically by application performance manager 222, based on user preferences, and/or based on user roles.

Priorities associated with each performance monitoring data source may be used by application performance manager 222 to retrieve a subset of relevant performance data from one or more of the identified available performance monitoring data sources for the selected content option. Presenter 224 may then present the retrieved performance data for display to a user, such as APM user 202. In an embodiment, presenter 224 may determine how the performance data will be displayed, and performance data from the highest priority data sources may be retrieved by application performance manager 222. In various embodiments, for a particular piece of data to be displayed, performance data may be retrieved only from the highest priority data source or aggregated from the highest n priority data sources, such as the highest three priority data sources. If a particular data source is unavailable, performance data may be retrieved from the next highest priority available data source.

In an embodiment, application performance manager 222 may aggregate retrieved performance data from multiple data sources by normalizing the performance data from each data source according to a data format associated with the target performance metric. For example, if database response times are retrieved from multiple performance monitoring data sources, a specified data format may inform application performance manager 222 to format retrieved response times in milliseconds. The data format associated with a target performance metric may be specified by a user, a particular content option, or automatically defined by application performance manager 222 based on the retrieved performance data.

Additionally, according to an embodiment, if performance data corresponding to a particular target performance metric is not found in any available data source, application performance manager 222 may dynamically adjust the target performance metrics to include related performance metrics. For example, if performance data corresponding to end user response time is unavailable, performance data corresponding to database response time may be retrieved instead. In a further embodiment, when performance data corresponding to a particular target performance metric is unavailable, application performance manager 222 may select a different content option that includes a different set of target performance metrics. In this way, application performance manager 222 and presenter 224 may be configured to present performance data based on availability and assigned priorities of each content option and/or performance monitoring data source. In an embodiment, presenter 224 may present the retrieved performance data in an interactive, graphical user interface, and APM user 202 may then view and interact with the user interface, for example, via client device 204.

As described above, application performance manager 222 and presenter 224 may enable a user to view performance data associated with application 210 from a plurality of performance monitoring services 208 without the need to individually query each data source. Furthermore, application manager 222 may simplify the process of identifying and aggregating relevant performance data, without requiring an end user to have complete knowledge of the architecture of application 210 or employed performance monitoring devices and/or services. In this manner, system 200 provides a single environment for intelligently viewing and analyzing relevant performance data across all components and layers of an application.

Figure 3:
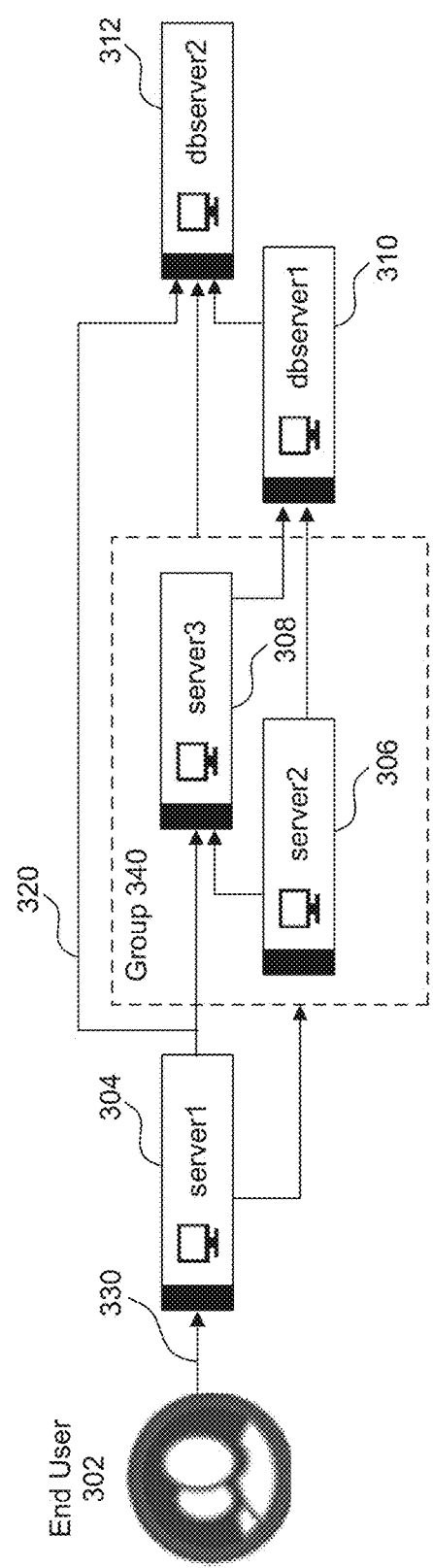
FIG. 3 is a diagram illustrating an example application model, according to an embodiment.

FIG. 3 is a diagram illustrating an example application model 300, according to an embodiment. Application model 300 includes end user 302, host servers 304-312, a plurality of relationships 320 indicating data flow among servers 304-312, and an end user relationship 330 representing a communication path between end user 302 and one or more of servers 304-312. End user 302 may represent end users accessing the application and host server 304-312 may be servers that are involved in execution or support of the application. Host servers 304-312 may further include various internal elements, implemented in software, hardware, or any combination thereof, such as databases, web application servers, .NET application domains, Java Virtual Machine implementations, or other application runtime environment components.

In an embodiment, a plurality of performance monitoring devices and/or services, such as performance monitoring services 208 of FIG. 2, may monitor servers 304-312, relationships 320, and end user relationship 330 of application model 300. For example, a performance monitoring service may be configured to measure response time between end user 302 and server 304 via end user relationship 330, while another service may be configured to monitor the health of servers 304-312. In an embodiment, as described with respect to FIG. 1, performance monitoring services may refer to performance monitors that run externally to the application, or instrumentation that monitors the application internally (e.g., internal elements of host servers 304-312), such as Java bytecode instrumentation or .NET code tracing. As described with respect to FIG. 2, an application performance manager and presenter, such as application performance manager 222 and presenter 224, may make use of application model 300 to intelligently retrieve and present relevant performance data associated with the application.

In an embodiment, application model 300 may be defined by an application model generator, such as application model generator 226, of FIG. 2, with the assistance of an application performance monitoring (APM) user, such as an administrator of the application. To generate application model 300, the APM user may initially specify a first host server involved in execution of the application. For example, the user may initially specify server 304 based on a search query, a known Internet Protocol (IP) address, or a hostname. In an embodiment, the application model generator may then automatically discover relationships with other backend servers involved in execution of the application, such as servers 306-312, based on connections and data flowing within the application. The APM user may manually add or delete servers from application model 300, but the application model generator greatly reduces the required knowledge of the user. In an embodiment, various internal elements of servers 304-312 may also be automatically discovered by the application model generator or manually specified by the APM user.

An APM user may also define an end user relationship 330 that represents a communication path between an end user and one or more of the servers of the application. For example, as depicted in FIG. 3, end user 302 may be coupled to server 304 via a communication path represented by end user relationship 330. End user relationship 330 may be used to measure user experience metrics such as end user response time.

In an embodiment, host servers may further be grouped together for display and monitoring purposes. For instance, group 340 includes host servers 306 and 308, which may, for example, represent application middleware. In further embodiments, various internal elements of a particular host server may also be grouped together.

In an embodiment, groups may be used by an application performance manager and presenter, such as application performance manager 222 and presenter 224 of FIG. 2, to aggregate and display performance data at group level. Groups may also be used by the application performance manager or the APM user to generate content options related to host servers and/or internal elements of host servers within a particular group.

Once host servers and relationships are defined in application model 300, the APM user may select or exclude available performance monitoring devices and/or services to monitor each server and relationship. In an embodiment, the application model generator may automatically identify available performance monitoring services, and thus the APM user may only need to choose which services should be used to monitor (or excluded from monitoring) each component or group of components of application model 300. This information may then be stored in application model 300. In an embodiment, performance monitoring services may also be excluded at an application level. For example, the APM user may select only a subset of available performance monitoring services to monitor the application and exclude the rest. Once published, application model 300 may be used to retrieve and present performance data from one or more performance monitoring data sources as described with respect to FIG. 2.

Example User Interface

Figure 4:
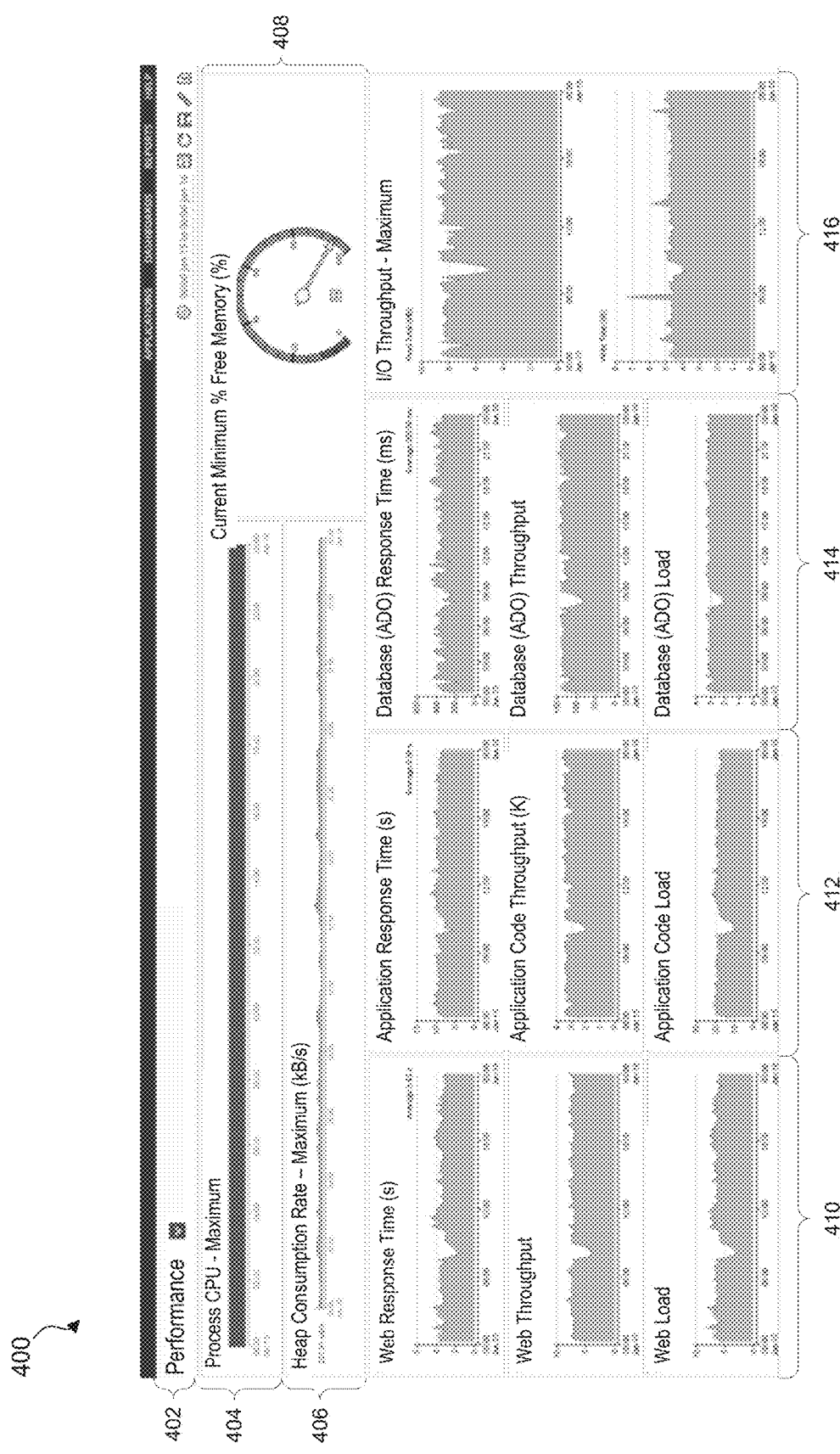
FIG. 4 is a diagram illustrating an example interface for displaying performance data from one or more performance monitoring data sources, according to an embodiment.

FIG. 4 is a diagram illustrating an example interface 400 for displaying performance data from one or more performance monitoring data source, according to an embodiment. Interface 400 includes header panel 402, data panels 404-408, data areas 410-414, and data panel 416. Header panel 402 includes a title and navigation options, data panels 404 and 406 display server CPU usage, data panel 408 displays memory usage, data area 410 includes three data panels that display end user performance data, data area 412 includes three data panels that display application code-level performance data, data area 414 includes three data panels that display database-level performance data, and data panel 416 displays input/output throughput data. Interface 400 may be generated by a presenter, such as presenter 224 of FIG. 2.

In an embodiment, the contents of interface 400 may be based on a selected content option for display. The content option may specify target performance metrics to be displayed in interface 400. For example, the content option depicted in FIG. 4 may specify web response time, web throughput, and web load as target performance metrics, as well as the layout of performance data corresponding the target performance metrics. An application performance manager, such as application performance manager 222 of FIG. 2, may use these specified metrics to retrieve relevant performance data from one or more performance monitoring data sources. In alternate embodiments, the content option may specify one or more performance data types to display, and the application performance manager may determine target performance metrics based at least in part on the specified types. In an embodiment, content option configurations, including target performance metrics, target performance data types, and layout of data, may be stored in configuration files or any type of structured data store. Further, in an embodiment, the content option may target different types of performance data, e.g., end user experience data, network performance data, and application/code-level performance data, for display in an interface such as interface 400.

In order to reduce the burden on a user when requesting to view application performance data, in an embodiment, standard dashboards may be available to the user. These standard dashboards may be associated with one or more content options that target logical groupings of available performance data based on an application model, such as application model 300 of FIG. 3, to support triage and troubleshooting of application performance issues. In this manner, standard dashboards may display performance data related to, for example, end user experience, application/ code-level performance, network performance, or may combine performance data from multiple perspectives into a high-level overview dashboard. A standard dashboard used to display a graphical representation of the application model may also be available. In an embodiment, standard dashboards may display performance data targeted at particular users based on user roles and preferences. Standard dashboards may be predefined or automatically generated by an application performance manager, such as application performance manager 222 of FIG. 2, based on the application model.

According to an embodiment, an APM administrator may also create custom dashboards as needed. In various embodiments, an administrator may specify and prioritize existing content options and/or generate new content options to be associated with a custom dashboard. In an embodiment, an administrator may customize panels and elements in order to generate a content option for a custom dashboard. For example, an administrator may select data to display in a custom dashboard panel by specifying target performance metrics, performance data types, and/or particular data sources to include in the panel. An administrator may also choose to display performance data in the panel related to specific components of the application (e.g., particular server instances). In further embodiments, an administrator may specify how to display and aggregate data within a panel or element of a custom dashboard. For example, visual characteristics, such as but not limited to, colors, graph types, line types, and positions of retrieved data may be customized for display purposes. This display configuration may be stored and associated with the custom dashboard and generated content option. In an embodiment, individual panels or elements may be duplicated from one dashboard to another at the request of the administrator. A request to view a custom dashboard may be initiated by an APM user in a similar manner to a request to view a standard dashboard.

Figure 5:
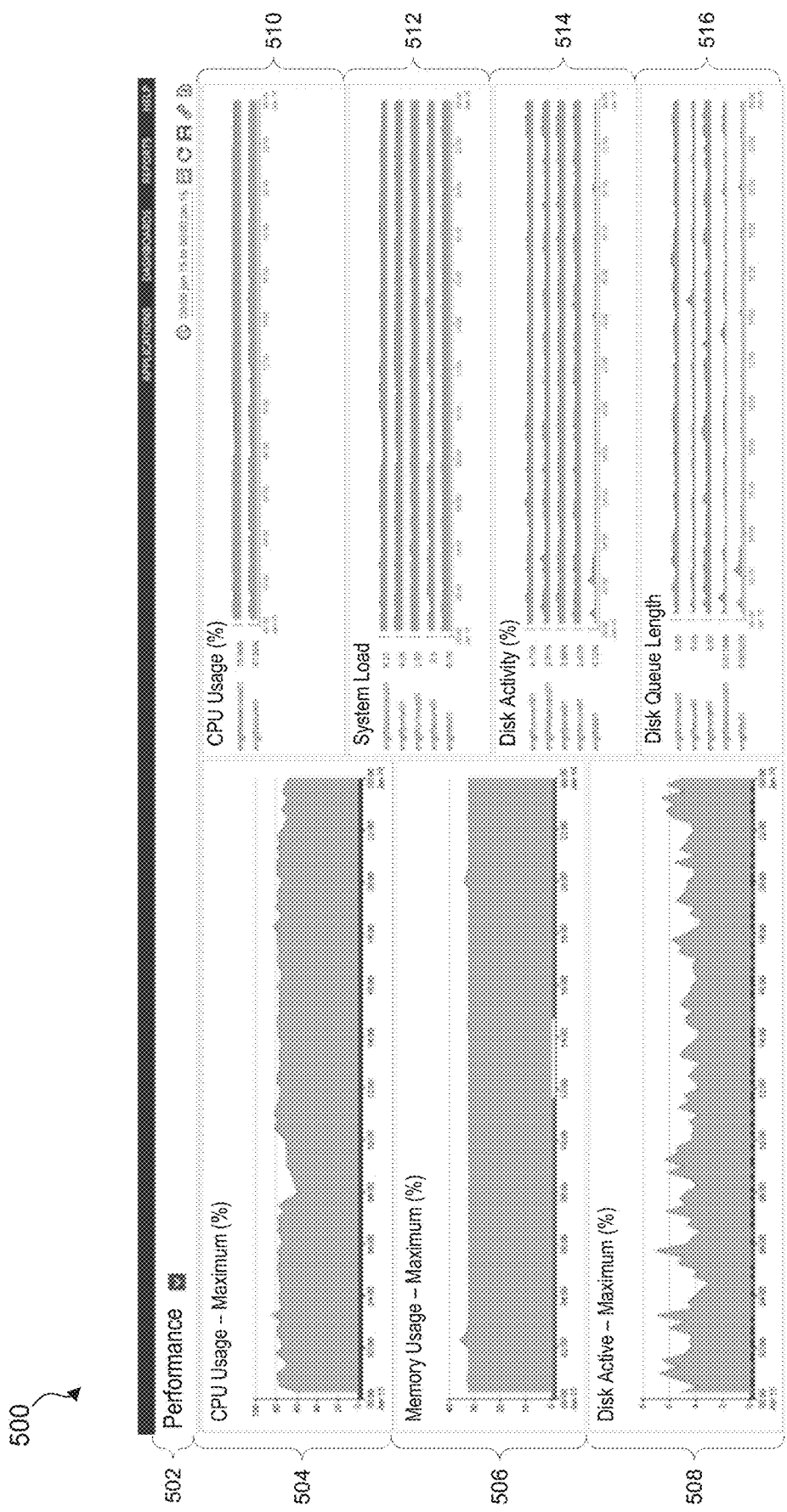
FIG. 5 is a diagram further illustrating an example interface for displaying performance data from one or more performance monitoring data sources, according to an embodiment.

FIG. 5 is a diagram further illustrating an example interface 500 for displaying performance data from one or more performance monitoring data sources, according to an embodiment. Interface 500 includes header panel 502 and data panels 504-516. Header panel 502 displays a title and navigation options, data panels 504-508 display aggregated server CPU, memory, and disk usage, and data panels 510-516 display server CPU, memory, and disk usage broken down by host server.

In an embodiment, the contents of interface 500 and the contents of interface 400 of FIG. 4 may be based on the same APM user request to view application performance data, but may correspond to a different content option. As described with respect to FIG. 2, the content option displayed may be selected based on assigned priorities of content options and availability of performance data corresponding to each content option. For example, the content option displayed in interface 400 may include performance data retrieved from a data source that collects code-level execution data. In interface 500, this data source may not be available, and thus a lower priority content option may be displayed. In an embodiment, an application performance manager, such as application performance manager 222 of FIG. 2, may monitor the connectivity status of each employed performance monitoring data source and select a content option for display based on availability of the performance monitoring data sources. In this manner, the highest priority content option with available data may be displayed.

In an embodiment, the application performance manager may adapt a particular content option for display based on availability of performance monitoring data sources, rather than selecting a lower priority content option. For example, performance monitoring data sources may similarly be assigned priorities for a content option, and the application performance manager may adapt the content option to display the highest priority available data targeted by the content option.

Figure 6:
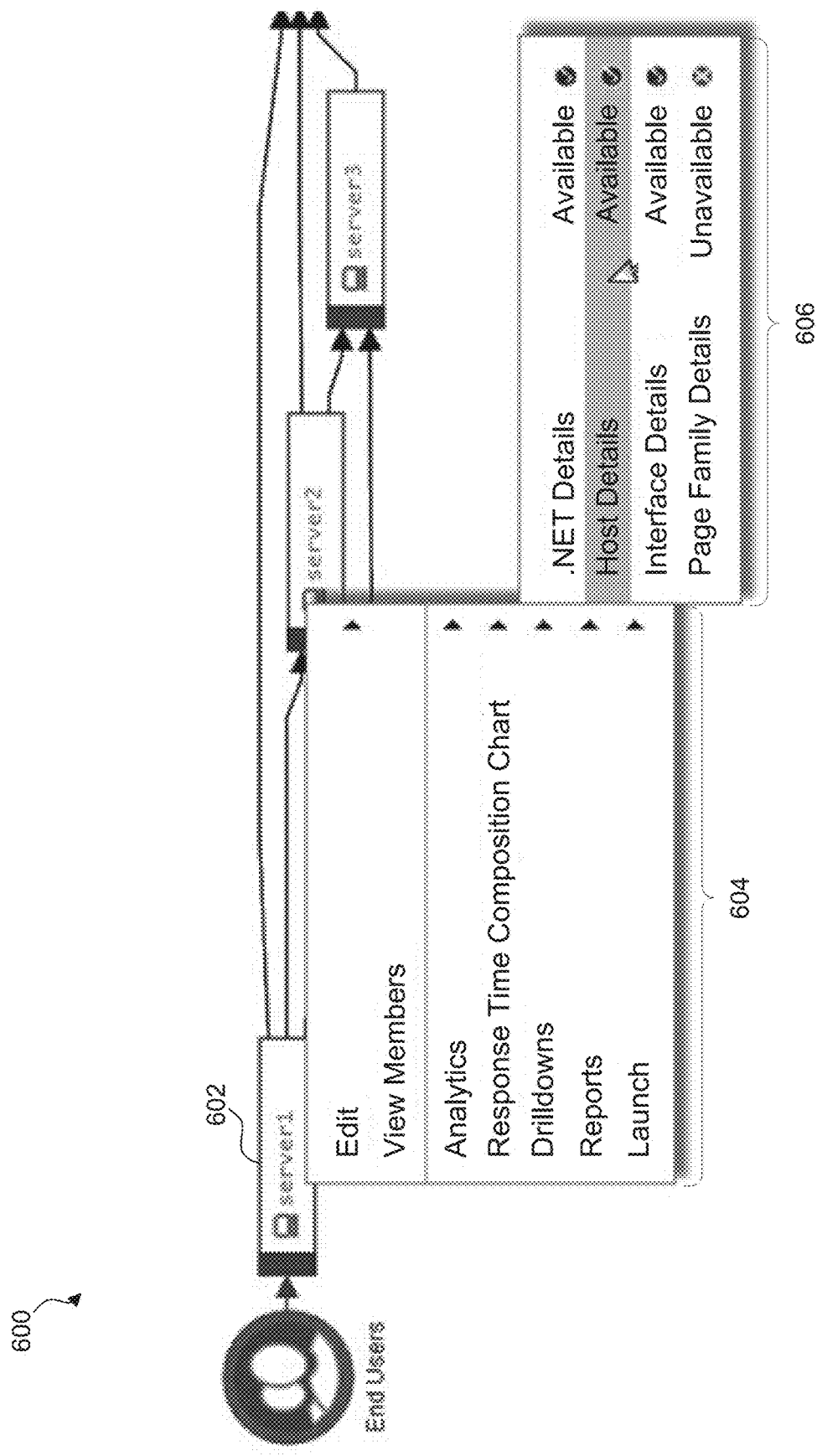
FIG. 6 is a diagram illustrating performance data drill-down options in an example interface, according to an embodiment.

FIG. 6 is a diagram illustrating performance data drilldown options in an example interface 600, according to an embodiment. Interface 600 depicts an application model and includes a server 602 and context menus 604 and 606. In the scenario depicted in FIG. 600, server 602 has been selected.

Context menu 604 displays various menu options associated with server 602, including drilldown options. Context menu 606 displays both available and unavailable drilldown options associated with server 602. Each available option may enable a user to view detailed performance data related to a specific application component or grouping of components. For example, the Host Details drilldown option displayed in context menu 606 may cause an application performance manager and presenter, such as application performance manager 222 and presenter 224 of FIG. 2, to retrieve and present performance data specific to server 602. As previously described, performance data associated with server 602 may be retrieved from one or more application performance data sources without requiring the user to specify or directly communicate with the data sources. In an embodiment, the application performance manager may also detect and disable drilldown options that are unavailable, such as Page Family Details, as shown in context menu 606. This drilldown option may be unavailable, for example, due to connectivity issues with a data source that includes Page Family Details data for server 602, or in the case that server 602 is not being monitored by a data source that includes data related to Page Family Details. In this manner, an unavailable drilldown option includes no content options that contain available data. This prevents an APM user from selecting a drilldown option that does not include content to display. Similar drilldown context menus and options may appear in other standard or custom dashboards.

Figure 7:
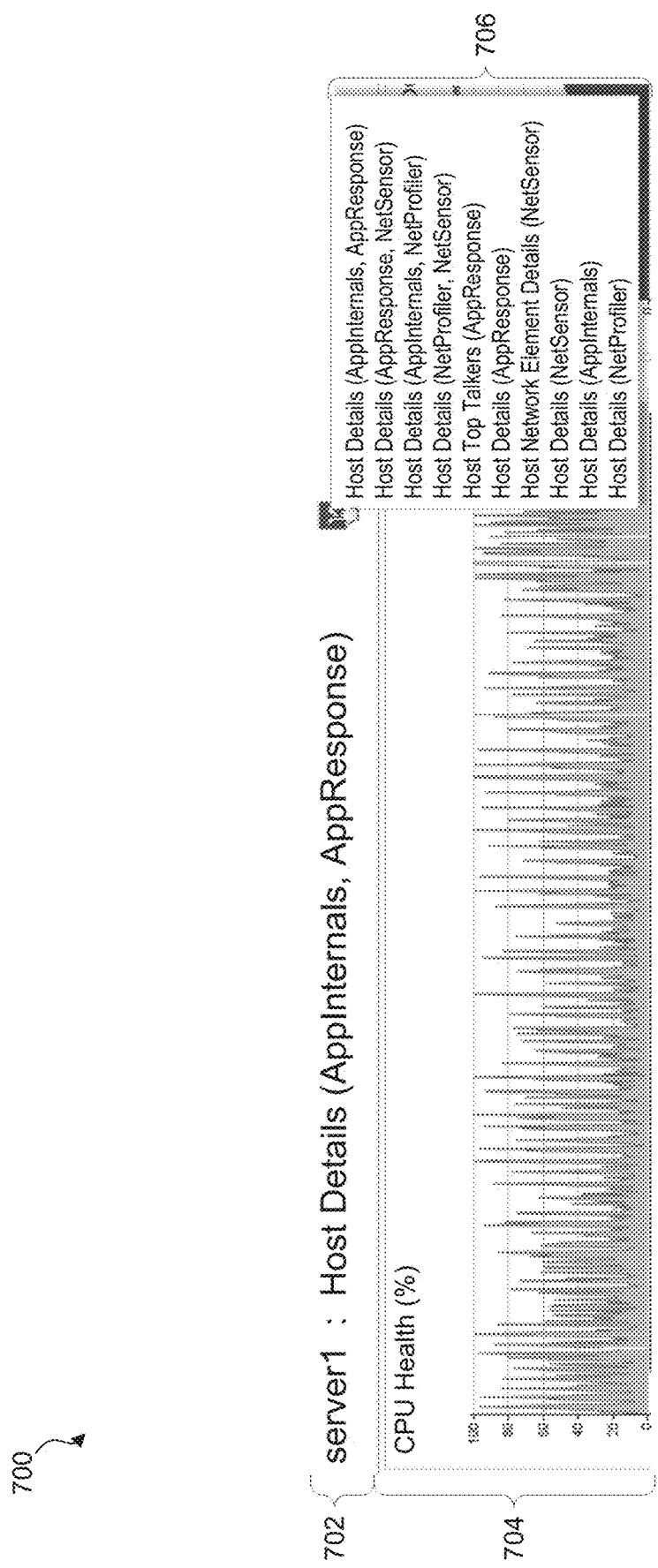
FIG. 7 is a diagram illustrating an example interface for displaying performance data related to a particular host server, according to an embodiment.

FIG. 7 is a diagram illustrating an example interface 700 for displaying performance data related to a particular host server. Interface 700 depicts performance data associated with a particular host server, such as any of servers 304-312 of FIG. 3, and includes a header panel 702, and data panel 704, and a dropdown menu 706. Header panel 702 denotes the hostname of the host server, a title, and a list of content options for which targeted performance data has been retrieved. Data panel 704 displays retrieved performance data associated with the host server.

In the interface depicted in FIG. 7, performance data has been retrieved from two different data sources of types AppInternals and AppResponse for display. In this embodiment, interface 700 enables an APM user, such APM user 202 of FIG. 2, to display performance data from multiple data sources in a single display. In a further embodiment, like performance data retrieved from multiple data sources may be normalized and aggregated as described with respect to FIG. 2 before being displayed. Although the displayed content option depicted in FIG. 7 may have been selected based upon availability and assigned priorities of content options, dropdown menu 706 provides options for viewing performance data from other available content options. This provides a high degree of control to an end user without requiring any action of the user.

Example Method

Figure 8:
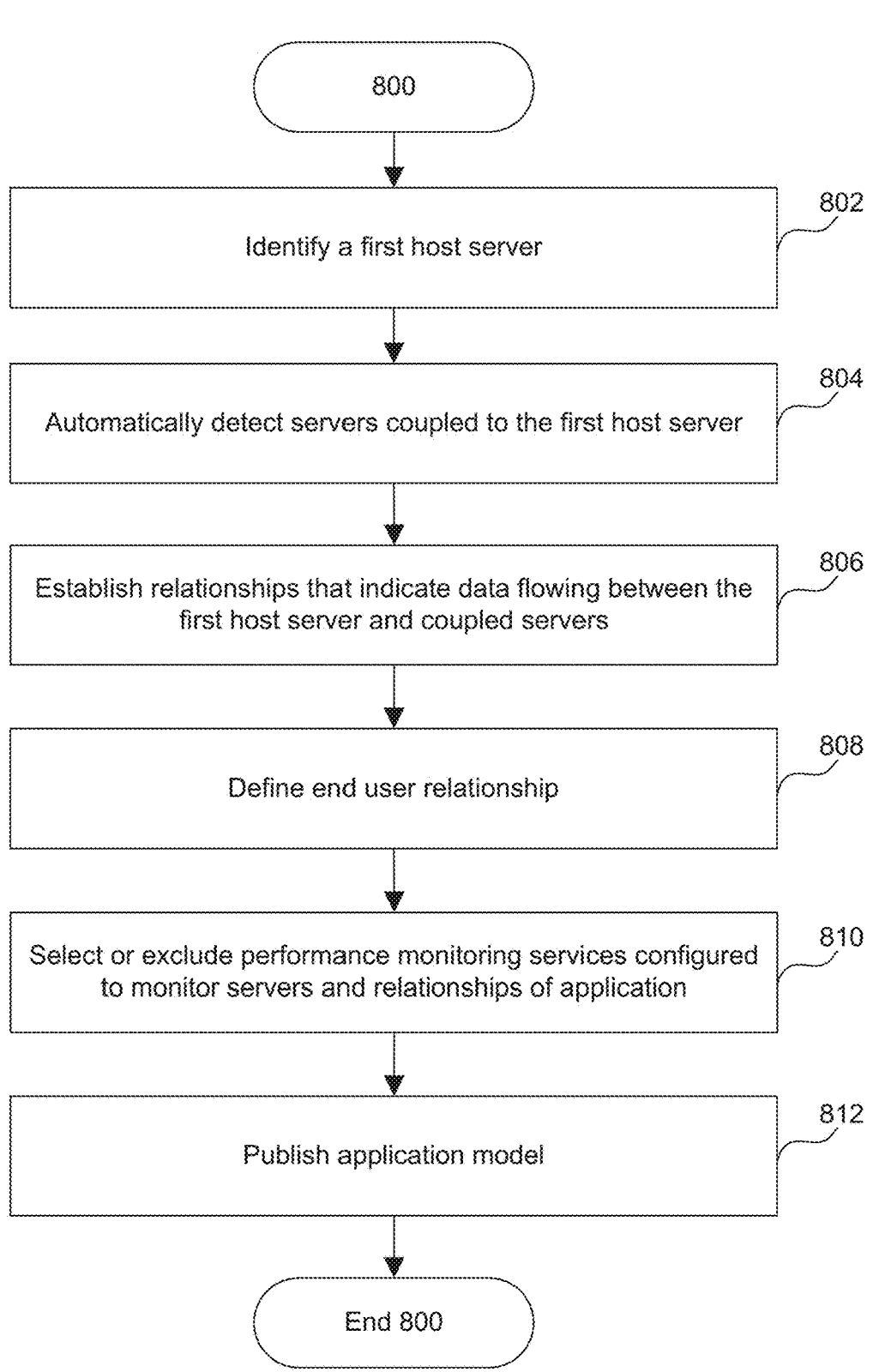
FIG. 8 is an example method for defining an application model, according to an embodiment.

FIG. 8 is an example method 800 for defining an application model, according to an embodiment. Method 800 begins at stage 802 where a first host server involved in execution of an application may be identified. For example, a user may specify the first server, such as server 304 of FIG. 3, based on a search query, a known IP address, or a hostname. At stage 804, servers coupled to the first host server, for example servers 306-312 of FIG. 3, may be automatically detected and included in the application model based on connections and data flowing within the application. In an embodiment, the user may manually add or delete servers from the application model as desired.

At stage 806, relationships, for example relationships 320 of FIG. 3, are established among the first host server and coupled servers. These relationships may indicate that data flows between particular host servers involved in execution of the application, and client-server roles between the host servers (e.g., an application server may act as a client that initiates communication with and sends requests to a database server). At stage 808, an end user relationship that represents a communication path between an end user and one of the servers of the application model, for example between end user 302 and server 304 of FIG. 3, may be defined. In an embodiment, this end user relationship may be used to measure user experience metrics such as end user response time.

At stage 810, performance monitoring devices and/or services configured to monitor each server and relationship defined in the application model, such as performance monitoring services 208 of FIG. 2, may be selected for or excluded from use. In an embodiment, available performance monitoring services may be automatically identified, and thus a user may only need to choose which services should be used to monitor each component or group of components defined in the application model. This information may then be stored in the application model and used to retrieve and present performance data from multiple performance monitoring data sources as described with respect to FIG. 2. In an embodiment, as described with respect to FIG. 1, performance monitoring services may refer to performance monitors that run externally to the application, or instrumentation that monitors the application internally, such as Java bytecode instrumentation or .NET code tracing.

Finally, at stage 812, the application model may be published. This action signifies that editing of the application model is complete, and standard and custom dashboards may be updated to reflect the elements of the published application model. In an embodiment, stages 802-812 may be performed or assisted by an application model generator, such as application model generator 226 of FIG. 2, and stages 802-812 may be repeated to address changes in application architecture.

Figure 9:
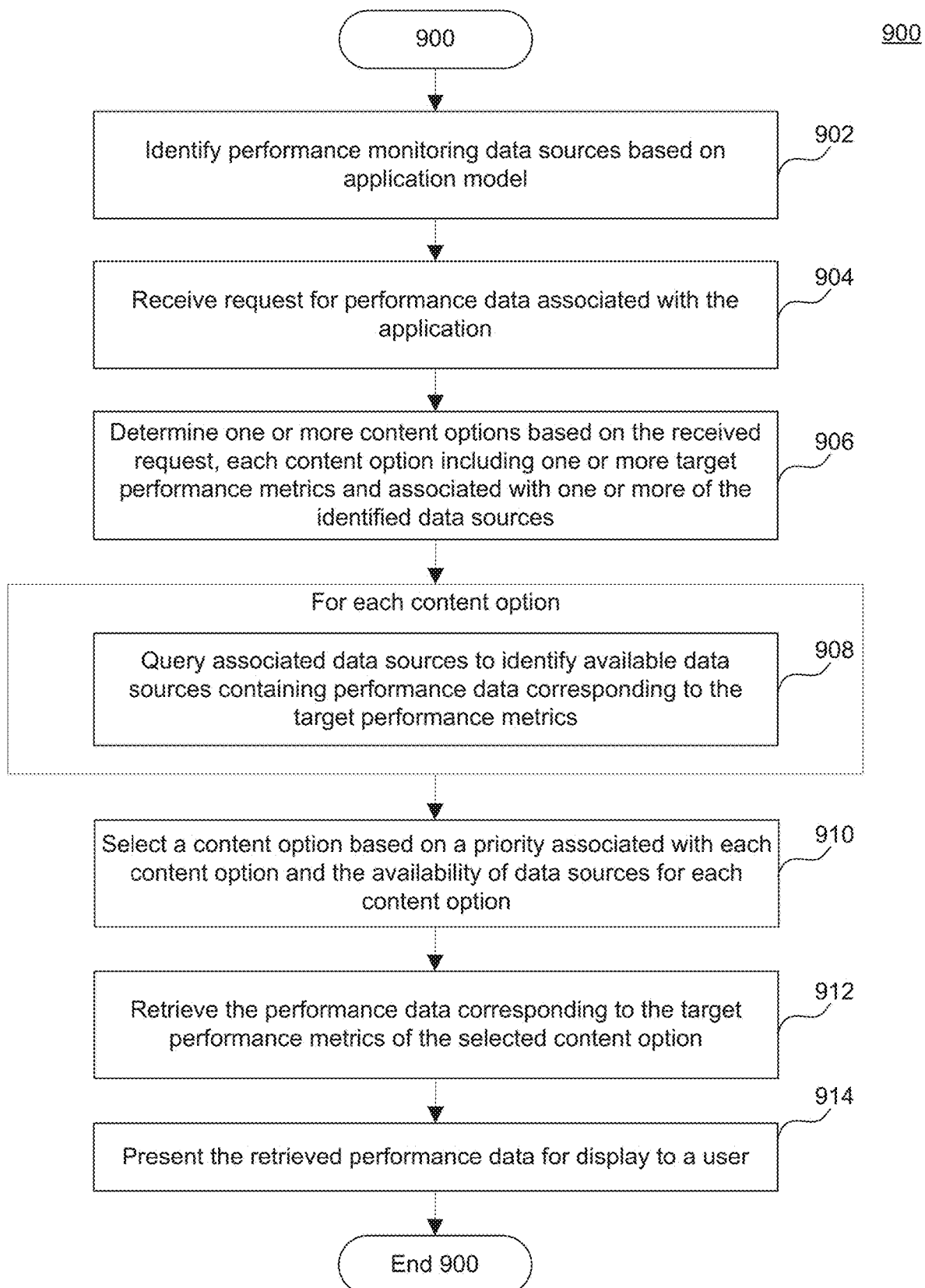
FIG. 9 is an example method for adaptively displaying application performance data, according to an embodiment.

FIG. 9 is an example method 900 for adaptively displaying application performance data, according to an embodiment. Method 900 begins at stage 902 where a plurality of performance monitoring data sources may be identified based on an application model, such as an application model described with respect to FIGS. 3 and 8. Data sources may either be specified in the application model (e.g., data sources monitoring internal elements of host servers, such as code instrumentation), or identified based on being coupled to the application (e.g., data sources coupled to host servers or relationships defined in the application model). For example, performance monitoring data sources 208 of FIG. 2 may act as data sources that may be identified at stage 906. In an embodiment, the application model may further enable identified data sources to be excluded from use with the application.

At stage 904, a request may be received for performance data associated with the application. At stage 906, one or more content options may be determined based on the received request, each content option including one or more target performance metrics and associated with one or more of the identified performance monitoring data sources. For example, a request to view performance data associated with a particular host server may correspond to one or more host detail content options that include appropriate target performance metrics related to performance of the host server. In another example, a request may correspond to content options tailored toward the requesting user.

Examples of target performance metrics may include, but are not limited to, end user response times, internal code- or method-level response times, database load, and CPU usage. Target performance metrics may be directed at some or all application components of the application, or at individual application components, such as individual servers, networking elements, application code modules, end users, or any combination thereof.

In an embodiment, and APM user, such as APM user 202 of FIG. 2, may initiate a request by selecting a dashboard to view. As described with respect to FIG. 2, A dashboard may be associated with one or more content options, which may be predefined (e.g., stored as lists of content options) and/or determined dynamically based on the received request. For example, content options associated with the dashboard may be determined dynamically from existing content options based on relevance to the received request, characteristics of the requesting user (e.g., user roles and user preferences), and/or additional filtering parameters. In an embodiment, when a request to view a dashboard is received, a content option may be chosen from a collection of content options associated with the dashboard based on priorities defined within the collection of content options. For example, the dashboard may correspond to a configuration file containing a prioritized list of content options for display.

At stage 908, for each determined content option, each associated performance monitoring data source may be queried to identify available (e.g., connected) data sources that contain performance data corresponding to the target performance metrics of the content option. In an embodiment, individual queries may be constructed for each of the plurality of performance monitoring data sources based on information derived from the application model. For example, a particular data source may publish a query API, accept direct database queries, or only accept protocol-specific messages. Queries may be constructed accordingly to identify performance data available from each data source that correspond to the target performance metrics. In this manner, a user does not need to understand how to directly query each performance monitoring data source to determine whether relevant performance data exists.

At stage 910, a content option may be selected from the one or more determined content options based on priorities associated with each content option and the availability of associated data sources for each content option. In an embodiment, priorities of content options may be assigned, for example, based on data quality, user roles, or user preferences, and are intended to denote content options with the most relevant data to the received user request. In this manner, the content option with the highest priority that includes relevant performance data from available data sources may be selected.

At stage 912, the performance data corresponding to the target performance metrics of the selected content option may be retrieved from one or more of the identified available performance monitoring data sources for the selected content option. In an embodiment, a subset of the performance data may be retrieved based on relative priorities of each performance monitoring data source. That is, each performance monitoring data source may be assigned a relative priority used in determining when to display performance data from the data source. This priority may be assigned at a global level such that performance data from a higher priority data source generally may be preferred over a lower priority data source. In an embodiment, multiple priorities may be hierarchically assigned to each data source, for example a global priority and a priority for a particular content option. Different priorities may also be assigned for individual users or groups of users. In an embodiment, priorities may be determined automatically, based on user preferences, and/or based on user roles.

In an embodiment, performance data from the highest priority data sources may be retrieved at stage 912. In various embodiments, for a particular piece of data to be displayed, performance data may be retrieved only from the highest priority data source or aggregated from the highest n priority data sources, such as the highest three priority data sources. If a particular data source is unavailable, performance data may be retrieved from the next highest priority available data source. In an embodiment, stages 902-912 may be performed by an application performance manager, such as application performance manager 222 of FIG. 2.

Finally, at stage 914, the retrieved performance data may be presented for display to a user. In an embodiment, the retrieved performance data may be presented in an interactive, graphical user interface, for example interface 400 of FIG. 4 or interface 500 of FIG. 5, and a user may then view and interact with the user interface via a client device, such as client device 204 of FIG. 2. In an embodiment, stage 912 may be performed by a presenter, such as presenter 224 of FIG. 2.

Example Computer System

Figure 10:
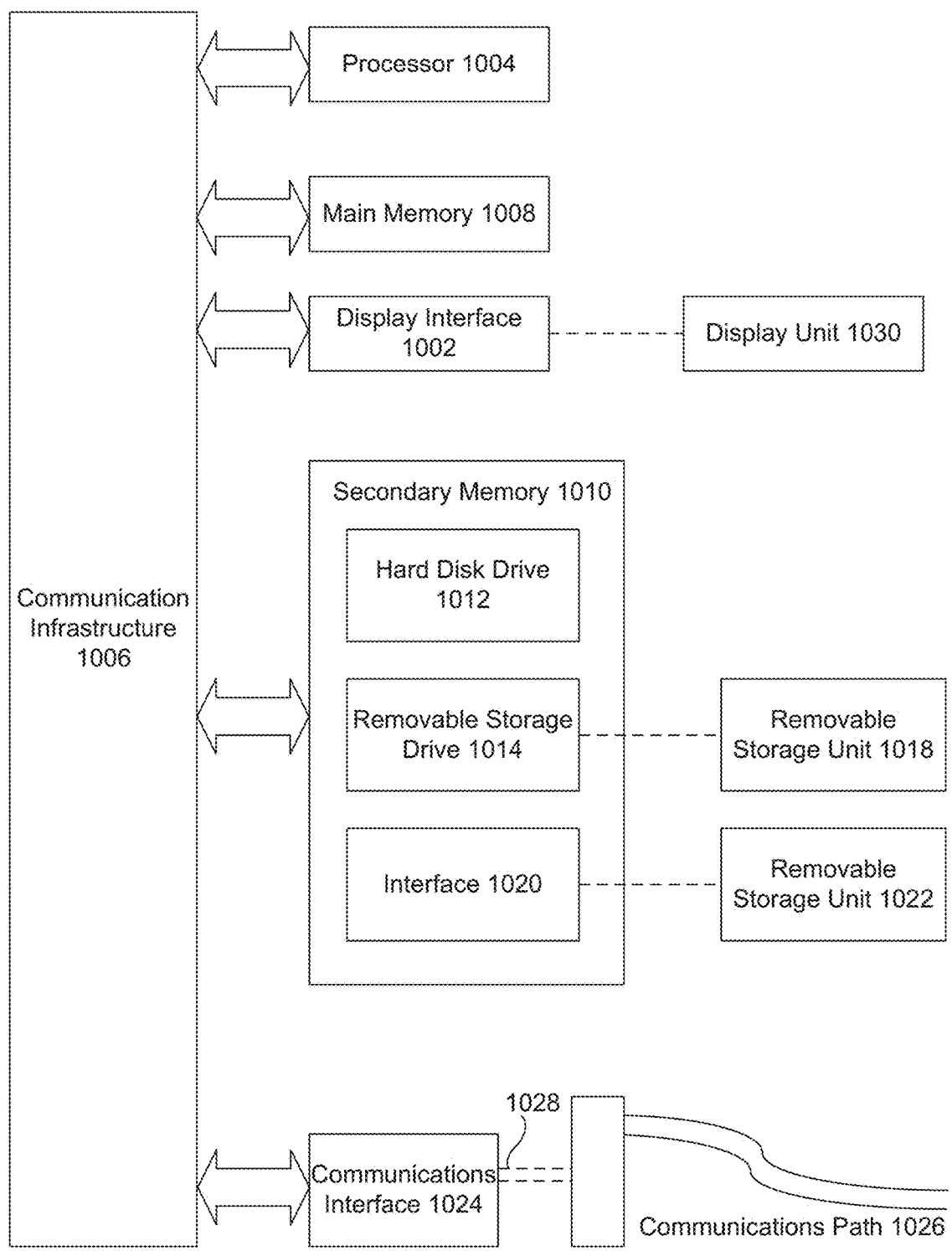
FIG. 10 is a diagram illustrating an example computing device, according to an embodiment.

FIG. 10 is a diagram illustrating an example computing system useful for implementing various embodiments. Various embodiments can be implemented, for example, using one or more well-known computer systems, such as computer system 1000. Computer system 1000 can be any well-known computer capable of performing the functions described herein, such as computers available from International Business Machines, Apple, Sun, HP, Dell, Sony, Toshiba, etc.

Computer system 1000 includes one or more processors (also called central processing units, or CPUs), such as a processor 1004. Processor 1004 may be connected to a communication infrastructure or bus 1006.

One or more processors 1004 may each be a graphics processing unit (GPU). In an embodiment, a GPU is a processor that is a specialized electronic circuit designed to rapidly process mathematically intensive applications on electronic devices. The GPU may have a highly parallel structure that is efficient for parallel processing of large blocks of data, such as mathematically intensive data common to computer graphics applications, images and videos.

Computer system 1000 also includes user input/output device(s) 1003, such as monitors, keyboards, pointing devices, etc., which communicate with communication infrastructure 1006 through user input/output interface(s) 1002.

Computer system 1000 also includes a main or primary memory 1008, such as random access memory (RAM). Main memory 1008 may include one or more levels of cache. Main memory 1008 has stored therein control logic (i.e., computer software) and/or data.

Computer system 1000 may also include one or more secondary storage devices or memory 1010. Secondary memory 1010 may include, for example, a hard disk drive 1012 and/or a removable storage device or drive 1014. Removable storage drive 1014 may be a floppy disk drive, a magnetic tape drive, a compact disk drive, an optical storage device, tape backup device, and/or any other storage device/drive.

Removable storage drive 1014 may interact with a removable storage unit 1018. Removable storage unit 1018 includes a computer usable or readable storage device having stored thereon computer software (control logic) and/or data. Removable storage unit 1018 may be a floppy disk, magnetic tape, compact disk, DVD, optical storage disk, and/or any other computer data storage device. Removable storage drive 1014 reads from and/or writes to removable storage unit 1018 in a well-known manner.

According to an exemplary embodiment, secondary memory 1010 may include other means, instrumentalities or other approaches for allowing computer programs and/or other instructions and/or data to be accessed by computer system 1000. Such means, instrumentalities or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1000 may further include a communication or network interface 1024. Communication interface 1024 enables computer system 1000 to communicate and interact with any combination of remote devices, remote networks, remote entities, etc. (individually and collectively referenced by reference number 1028). For example, communication interface 1024 may allow computer system 1000 to communicate with remote devices 1028 over communications path 1026, which may be wired and/or wireless, and which may include any combination of LANs, WANs, the Internet, etc. Control logic and/or data may be transmitted to and from computer system 1000 via communication path 1026.

In an embodiment, a tangible apparatus or article of manufacture comprising a tangible computer useable or readable medium having control logic (software) stored thereon is also referred to herein as a computer program product, program storage device, or computer-readable storage device. This includes, but is not limited to, computer system 1000, main memory 1008, secondary memory 1010, and removable storage units 1018 and 1022, as well as tangible articles of manufacture embodying any combination of the foregoing. Such control logic, when executed by one or more data processing devices (such as computer system 1000), causes such data processing devices to operate as described herein.

Based on the teachings contained in this disclosure, it will be apparent to persons skilled in the relevant art(s) how to make and use the inventions using data processing devices, computer systems and/or computer architectures other than that shown in FIG. 10. In particular, embodiments may operate with software, hardware, and/or operating system implementations other than those described herein.

CONCLUSION

Identifiers, such as "(a)," "(b)," "(i)," "(ii)," etc., are sometimes used for different elements or steps. These identifiers are used for clarity and do not necessarily designate an order for the elements or steps.

Embodiments of the present inventions have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of specific embodiments will so fully reveal the general nature of the inventions that others can, by applying knowledge within the skill of the art, readily modify and/or adapt for various applications such specific embodiments, without undue experimentation, without departing from the general concept of the present inventions. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present inventions should not be limited by any of the above-described embodiments, but should be defined only in accordance with the following claims and their equivalents.

What is claimed is:

1. A system for adaptively displaying application performance data, comprising:
   one or more computing devices;
   an application performance manager, implemented on the one or more computing devices, configured to:
   identify a plurality of performance monitoring data sources storing performance data for a plurality of servers through which data flows when an application is executed;
   receive a request from a user for performance data of the application;
   determine one or more content options based on the received request, each content option including one or more target performance metrics in the plurality of performance monitoring data sources, wherein each performance monitoring data source of the plurality of performance monitoring data sources includes a priority for each content option;
   for each content option, query each performance monitoring data, source to identify available data sources that contain performance data corresponding to one or more of the target performance metrics of the content option;
   select a content option from the one or more content options that has a highest priority among content options the available data sources;
   retrieve the performance data corresponding to the one or more of the target performance metrics of the selected content option from one or more of the identified available performance monitoring data sources associated with the selected content option, wherein the one or more of the identified available performance monitoring data sources are selected based on the priority associated with the selected content option of each performance monitoring data source; and a presenter, implemented on the one or more computing devices, configured to present the retrieved performance data to the user in an interactive graphical user interface.

2. The system of claim 1, wherein to identify the plurality of performance monitoring data sources, the application performance manager is further configured to:

filter the plurality of performance monitoring data sources based on a performance data type associated with each target performance metric of the determined one or more content options.

3. The system of claim 1, wherein the request corresponds to dashboard selected by the user, and wherein the dashboard is associated with the one or more content options.

4. The system of claim 1, wherein the application 2 performance manager is further configured to:

normalize the retrieved performance data corresponding to the one or more of the target performance metrics according to a data format associated with the one or more of the target performance metrics, wherein the retrieved performance data corresponding to the one or more of the target performance metrics are from at least two of the available data sources for the selected content option.

5. The system of claim 1, wherein the selected content option is selected based at least in part on the user's role.

6. The system of claim 1, wherein the selected content option is selected based at least in part on the user's preferences.

7. A method for adaptively displaying application performance data, comprising:

identifying a plurality of performance monitoring data sources storing performance data for a plurality of servers through which data flows when an application is executed;

receiving a request from a user for performance data of the application;

determining one or more content options based on the received request, each content option including one or more target performance metrics in the plurality of performance monitoring data sources, wherein each performance monitoring data source of the plurality of performance monitoring data sources includes a priority for each content option;

for each content option, querying each performance monitoring data sources to identify available data sources that contain performance data corresponding to one or more of the target performance metrics of the content option;

selecting a content option from the one or more content options that has a highest priority among content options in the available data sources;

retrieving the performance data corresponding to the one or more of the target performance metrics of the selected content option from one or more of the identified available performance monitoring data sources associated with the selected content option, wherein the one or more of the identified available performance monitoring data sources are selected based on the priority associated with the selected content option of each performance monitoring data source; and presenting the retrieved performance data to the user in an interactive graphical user interface.

8. The method of claim 7, wherein the identifying further comprises:

filtering the plurality of performance monitoring data sources based on a performance data type associated with each target performance metric of the determined one or more content options.

9. The method of claim 7, wherein the request corresponds to a dashboard selected by the user, and wherein the dashboard is associated with the one or more content options.

10. The method of claim 7, further comprising:

normalizing the retrieved performance data corresponding to the one or more of the target performance metrics according to a data format associated with the one or more of the target performance metrics, wherein the retrieved performance data corresponding, to the one or more of the target performance metrics are from at least two of the available data sources for the selected content option.

11. The method of claim 7, wherein the selected content option is selected based at least in part on the user's role.

12. The method of claim 7, wherein the selected content option is selected based at least in part on the user's preferences.

13. A non-transitory computer-readable storage device having instructions stored thereon that, when executed by at least one computing device, causes the at least one computing device to perform operations comprising:

identifying a plurality of performance monitoring data sources storing performance data for a plurality of servers through which data flows when an application is executed;

receiving a request from a user for performance data the application;

determining one or more content options based on the received request, each content option including one or more target performance metrics in the plurality of performance monitoring data sources, wherein each performance monitoring data source of the plurality of performance monitoring data sources includes a priority for each content option;

for each content option, querying each performance monitoring data sources to identify available data sources that contain performance data corresponding to one or more of the target performance metrics of the content option;

selecting a content option from the one or more content options that has a highest priority among content options in the available data sources;

retrieving the performance data corresponding to the one or more of the target performance metrics of the selected content option from one or more of the identified available performance monitoring data sources associated with the selection content option, wherein the one or more of the identified available performance monitoring data sources are selected based on the priority associated with the selected content option of each performance monitoring data source; and presenting the retrieved performance data to the user in an interactive graphical user interface.

14. The non-transitory computer-readable storage device of claim 13, wherein the identifying further comprises:

filtering the plurality of performance monitoring data sources based on a performance data type associated with each target performance metric of the determined one or more content options.

15. The non-transitory computer-readable storage device of claim 13, wherein the request corresponds to a dashboard selected by the user, and wherein the dashboard is associated with the one or more content options.

* * * * *